US011320669B2

(12) United States Patent
Sase et al.

(10) Patent No.: US 11,320,669 B2
(45) Date of Patent: May 3, 2022

(54) NON-CONTACT OPERATING APPARATUS FOR VEHICLE AND VEHICLE

(71) Applicant: SUBARU CORPORATION, Tokyo (JP)

(72) Inventors: Hideyuki Sase, Tokyo (JP); Takemi Oguri, Tokyo (JP); Tomoyuki Kitamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/750,566

(22) Filed: Jan. 23, 2020

(65) Prior Publication Data

US 2020/0310154 A1 Oct. 1, 2020

(30) Foreign Application Priority Data

Mar. 27, 2019 (JP) .............................. JP2019-060598

(51) Int. Cl.
| | |
|---|---|
| *G02B 30/56* | (2020.01) |
| *B60W 50/08* | (2020.01) |
| *G05D 1/02* | (2020.01) |
| *B60W 50/14* | (2020.01) |

(52) U.S. Cl.
CPC ............. *G02B 30/56* (2020.01); *B60W 50/08* (2013.01); *G05D 1/021* (2013.01); *B60W 2050/146* (2013.01)

(58) Field of Classification Search
CPC ...... G03B 21/00–64; H04N 9/31–3197; G02B 27/01–0189
See application file for complete search history.

(56) References Cited

U.S. PATENT DOCUMENTS

| | | | |
|---|---|---|---|
| 2016/0238833 A1* | 8/2016 | Okumura | G06F 1/1643 |
| 2018/0210551 A1 | 7/2018 | Kitagawa | |
| 2018/0222490 A1* | 8/2018 | Ishihara | B60W 50/14 |
| 2020/0207366 A1* | 7/2020 | Kapuria | B60W 50/14 |

FOREIGN PATENT DOCUMENTS

JP 2017-027401 A 2/2017

* cited by examiner

*Primary Examiner* — Michelle M Iacoletti
*Assistant Examiner* — Christopher A Lamb, II
(74) *Attorney, Agent, or Firm* — Troutman Pepper Hamilton Sanders LLP

(57) ABSTRACT

A non-contact operating apparatus, for a vehicle, includes a generating unit, a projecting device, a detecting device, and a setting unit. The generating unit is configured to generate and update an image containing an image object. The image object is operable by an occupant present within a vehicle compartment of the vehicle. The projecting device is configured to project the image in a predetermined display region within the vehicle compartment of the vehicle. The detecting device is configured to detect a riding state of the occupant who is present in the vehicle compartment of the vehicle. The setting unit is configured to instruct the projecting device or the generating unit to project the image at a position at which the image object is operable by the occupant who is in the riding state detected by the detecting device.

11 Claims, 8 Drawing Sheets

| | OPERATION TYPE | MOTION DETERMINATION CONDITION | PROJECTED POSITION | | STIMULATION SETTING |
|---|---|---|---|---|---|
| | | | VICINITY | DISTANT | |
| MOVEMENT OPERATION | PUSH/PULL | FINGER + APPROXIMATELY-VERTICAL MOTION | ○ | ○ | FINGERTIP, STRONG IMPULSE |
| | SPECIFIC MOTION | BOTH HANDS FACING UPWARD | ○ | ○ | BOTH PALMS, INCREASE IN RAMP |
| HAND OPERATION | PET/TURN | MOTION IN SURFACE DIRECTION + LOW SPEED | ○ | ○ | PALM, WEAK STIMULATION |
| | ROTATE | MOTION IN SURFACE DIRECTION + HIGH SPEED | ○ | × | PALM, INCREASE OR DECREASE IN ACCORDANCE WITH SPEED |
| | HOLD/RELEASE | VARIATION IN FINGER INTERVAL | ○ | × | FINGER, INCREASE OR DECREASE IN ACCORDANCE WITH INTERVAL |
| | CRUSH | PALM + APPROXIMATELY-VERTICAL MOTION | ○ | × | PALM, STRONG AND LONG STIMULATION |
| | ⋮ | ⋮ | ⋮ | ⋮ | ⋮ |

FIG. 8

NON-CONTACT OPERATING APPARATUS FOR VEHICLE AND VEHICLE

CROSS-REFERENCE TO RELATED APPLICATIONS

The present application claims priority from Japanese Patent Application No. 2019-060598 filed on Mar. 27, 2019, the entire contents of which are hereby incorporated by reference.

BACKGROUND

The technology relates to a non-contact operating apparatus for a vehicle and to a vehicle.

Various kinds of operating members are provided in a vehicle. For example, a start switch, a handle, a shift lever, and a pedal directed to controlling of traveling of the vehicle are provided in the vicinity of a driver's seat in the vehicle. Further, operating members for an air conditioner, a navigation apparatus, an audio device, an image receiving device, a handsfree calling device, and other equipment devices are provided in the vehicle. Thus, a large number of operating members are provided in the vehicle. The large number of operating members may be laid out on an inner surface of a vehicle compartment. In recent years, however, the inner surface for layout in the vehicle compartment tends to become insufficient. For example, in a case where it is considered that a game machine, a network communication device, an entertainment device, or any other device may be added thereto, there is a possibility that operating members for these devices cannot further be added in the future.

In particular, for a vehicle, development of an automatic driving technique has advanced. In a case where the development of the automatic driving technique advances actually and the vehicle can travel autonomously without an occupant directly controlling traveling of the vehicle, there is a possibility that the occupant rides the vehicle in a state where a seat is reclined, for example. In this case, when the occupant wants to operate any operating apparatus, the occupant is required to rise from the seat for an operation and stretch his or her arm to the corresponding operating member laid out on the inner surface of the vehicle compartment to operate the operating member.

SUMMARY

An aspect of the technology provides a non-contact operating apparatus for a vehicle. The non-contact operating apparatus includes a generating unit, a projecting device, a detecting device, and a setting unit. The generating unit is configured to generate and update an image containing an image object. The image object is operable by an occupant present within a vehicle compartment of the vehicle. The projecting device is configured to project the image in a predetermined display region within the vehicle compartment of the vehicle. The detecting device is configured to detect a riding state of the occupant who is present in the vehicle compartment of the vehicle. The setting unit is configured to instruct the projecting device or the generating unit to project the image at a position at which the image object is operable by the occupant who is in the riding state detected by the detecting device.

An aspect of the technology provides a vehicle that includes a non-contact operating apparatus and two or more control devices. The non-contact operating apparatus includes a generating unit, a projecting device, a detecting device, and a setting unit. The generating unit is configured to generate and update an image containing an image object. The image object is operable by an occupant present within a vehicle compartment of the vehicle. The projecting device is configured to project the image in a predetermined display region within the vehicle compartment of the vehicle. The detecting device is configured to detect a riding state of the occupant who is present in the vehicle compartment of the vehicle. The setting unit is configured to instruct the projecting device or the generating unit to project the image at a position at which the image object is operable by the occupant who is in the riding state detected by the detecting device. The two or more control devices are coupled to the non-contact operating apparatus through an internal network. Each of the two or more control devices is configured to control an operation of the vehicle. Each of the two or more control devices is configured to acquire input information from the non-contact operating apparatus through the internal network. The input information is generated on the basis of a non-contact operation of the occupant against the image object in the image. The image is projected within the vehicle compartment by the non-contact operating apparatus.

An aspect of the technology provides a non-contact operating apparatus for a vehicle. The non-contact operating apparatus includes circuitry, a projecting device, and a detecting device. The circuitry is configured to control an operation of the non-contact operating apparatus. The projecting device is configured to project an image in a predetermined display region within a vehicle compartment of a vehicle. The image contains an image object. The detecting device is configured to detect a riding state of an occupant who is present in the vehicle. The circuitry is configured to generate and update the image. The circuitry is configured to give an instruction related to a setting for the projecting device and a setting regarding generation or update of the image to project the image at a position at which the image object is operable by the occupant who is in the riding state detected by the detecting device.

BRIEF DESCRIPTION OF THE DRAWINGS

The accompanying drawings are included to provide a further understanding of the disclosure, and are incorporated in and constitute a part of this specification. The drawings illustrate one example embodiment and, together with the specification, serve to explain the principles of the disclosure.

FIG. 8 is an explanatory diagram illustrating an example of an operation determining table that indicates a switched content of an operation and a stimulation based on the projected position illustrated in FIG. 7.

DETAILED DESCRIPTION

Figure 1A:
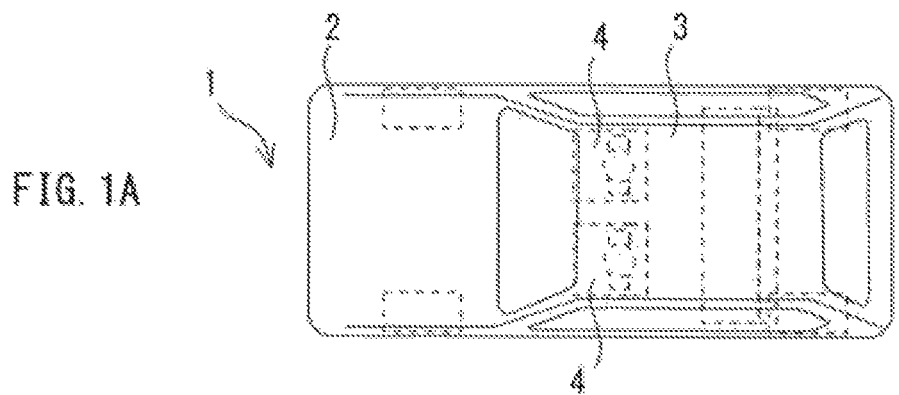
FIGS. 1A to 1C are each a schematic explanatory diagram illustrating an example of a vehicle according to one example embodiment of the technology.

Hereinafter, some example embodiments of the technology will be described with reference to the drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiment which is not recited in a most-generic independent claim of the disclosure are optional and may be provided on an as-needed basis. Throughout the present specification and the drawings, elements having substantially the same function and configuration are denoted with the same numerals to avoid any redundant description.

As disclosed in Japanese Unexamined Patent Application Publication (JP-A) No. 2017-027401, development of a new operating apparatus directed to operating of an image projected in a vehicle compartment of a vehicle has been required for the vehicle.

An operating apparatus for a vehicle disclosed in JP-A No. 2017-027401 described above presents an image, containing an image object, in front of an occupant who sits on a seat, and outputs a tactile stimulation based on an ultrasound field to an operation site of the occupant in response to an operation of the occupant against the presented image object. For this reason, the occupant is allowed to obtain an actual sensation of the operation against the image object.

However, the operating apparatus of JP-A No. 2017-027401 fixedly projects the image at a predetermined position within a vehicle compartment at which the image is operable by the occupant who sits on the seat with a driving posture.

In this case, for example, the occupant who reclines the seat to be relaxed cannot reach the image object projected at the predetermined position within the vehicle compartment, and cannot operate the image object in that state.

Therefore, in order to resolve a concern described above, it has been required to improve the operating apparatus for a vehicle.

Figure 1B:
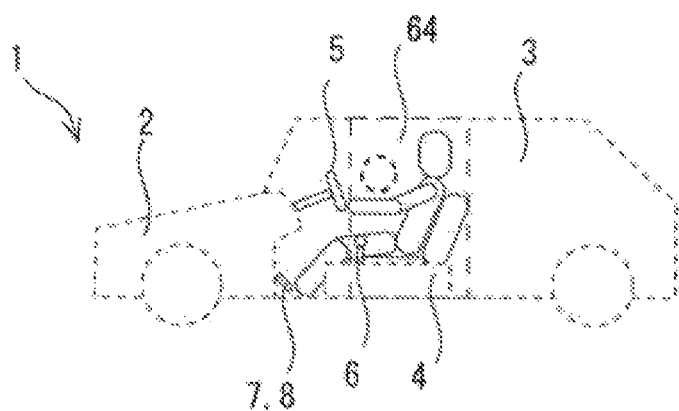
Figure 1C:
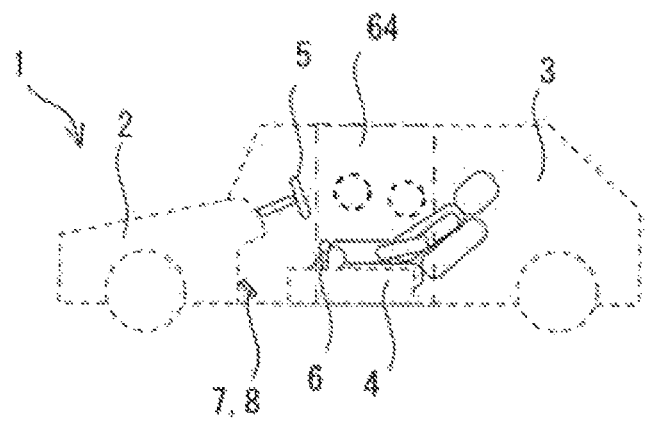

FIGS. 1A to 1C are each a schematic explanatory diagram of a vehicle 1 according to an example embodiment of the technology.

FIG. 1A is a top view of the vehicle 1. Each of FIG. 1B and FIG. 1C is a side view of the vehicle 1.

The vehicle 1 illustrated in FIGS. 1A to 1C may be one example of a vehicle. The vehicle 1 may have a vehicle body 2. A vehicle compartment 3 may be provided in the vehicle body 2. One or more occupants may be allowed to be present in the vehicle compartment 3. Two or more seats 4 on each of which the occupant sits may be provided in the vehicle compartment 3. A handle 5, a shift lever 6, a brake pedal 7, and an accelerator pedal 8 may be provided in a front portion of the vehicle compartment 3 as operating members in order for the occupant, e.g., a driver, to operate the operating members directed to traveling of the vehicle 1. As illustrated in FIG. 1B, since the driver may sit on the seat 4 with a driving posture, the driver is allowed to operate any of these operating members such as the handle 5 by stretching his or her hand to the operating member.

Further, as illustrated in FIG. 1B and FIG. 1C, a hollow square frame body 64 of a stimulation output device 45, which will be described later, may be provided in the vehicle compartment 3.

It is to be noted that, as illustrated in FIG. 1C, in a case where the occupant is present in the vehicle 1 in a reclining state in which the seat 4 is reclined to relax the occupant, the occupant may not be allowed to operate the operating member such as the handle 5 by stretching his or her hand thereto unless the occupant puts his or her upper body up from the seat 4.

Figure 2:
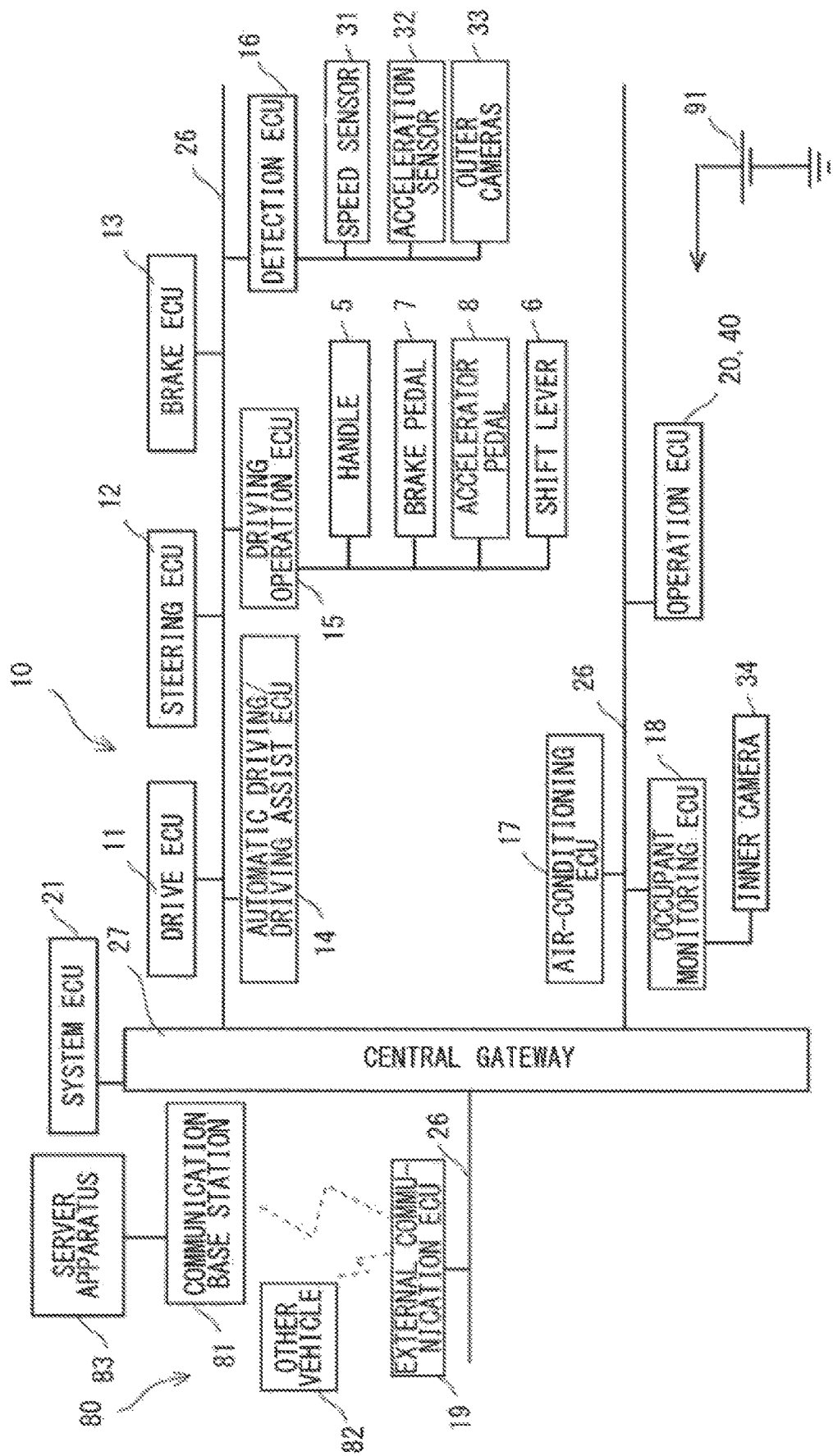
FIG. 2 is a schematic explanatory diagram illustrating an example a control system in the vehicle illustrated in FIG. 1.

FIG. 2 is a schematic explanatory diagram of a control system 10 in the vehicle 1 illustrated in FIGS. 1A to 1C. FIG. 2 illustrates two or more control devices that may be included in the control system 10 as represented by control electronic control units (ECUs) incorporated in the respective two or more control devices.

In a specific but non-limiting example, FIG. 2 illustrates a drive ECU 11, a steering ECU 12, a brake ECU 13, an automatic driving/driving assist ECU 14, a driving operation ECU 15, a detection ECU 16, an air-conditioning ECU 17, an occupant monitoring ECU 18, an external communication ECU 19, an operation ECU 20 as a non-contact operating apparatus 40, and a system ECU 21. For example, a vehicle network (internal network) 26 such as a controller area network (CAN) or a local interconnect network (LIN) may be adopted in the vehicle 1. The above-described control ECUs may be coupled to a central gateway (CGW) 27 via the vehicle network 26. The central gateway 27 may serve as a relay apparatus.

In each of control modules, the corresponding control ECU may be coupled to at least one electronic device used in the vehicle 1. When activated, each control ECU may execute various kinds of processes to control an operation of an electronic device coupled to the corresponding control ECU on the basis of information or data acquired from the vehicle network 26. Further, each control ECU may output information or data such as an operation state of the corresponding electronic device to the vehicle network 26.

Unillustrated operation detecting sensors for devices, such as the handle 5, the brake pedal 7, the accelerator pedal 8, or the shift lever 6, which the occupant operates to control the traveling of the vehicle 1, may be coupled to the driving operation ECU 15. The driving operation ECU 15 may output control information based on an operation amount detected by each of the operation detecting sensors to the vehicle network 26. The drive ECU 11, the steering ECU 12, and the brake ECU 13 may acquire necessary information from the vehicle network 26, and control the traveling of the vehicle 1.

The operation ECU 20 may acquire the control information from the driving operation ECU 15 through the vehicle network 26, and cause an unillustrated display device to display the acquired control information. An unillustrated operation device to be operated by the occupant may be coupled to the operation ECU 20 in addition to the display device. For example, the operation ECU 20 may be included in an operating apparatus for a driving operation together with the display device and the operation device. The non-contact operating apparatus 40, which will be described later, may be incorporated in the operating apparatus for the driving operation. In a case where the occupant operates the operation device with respect to the control information displayed by the display device, the operation ECU 20 may output input information for the operation device to the driving operation ECU 15 through the vehicle network 26. The driving operation ECU 15 may acquire the input information through the vehicle network 26, and execute a control based on the input information.

For example, a speed sensor 31 for the vehicle 1, an acceleration sensor 32, and outer cameras 33 may be coupled to the detection ECU 16. The acceleration sensor 32 may detect acceleration of the vehicle 1 due to, for example, contact of the vehicle 1. Each of the outer cameras 33 may capture an image of the surroundings of the vehicle 1. The detection ECU 16 may output detection values acquired from the speed sensor 31 and the acceleration sensor 32 of the vehicle 1 and images acquired from the respective outer cameras 33 to the vehicle network 26. In one example, the detection ECU 16 may predict contact of the vehicle 1 on the basis of the images from the outer cameras 33, and output a prediction result to the vehicle network 26. The central gateway 27 may relay various kinds of information.

For example, the automatic driving/driving assist ECU 14 may control traveling of the vehicle 1 until the vehicle 1 arrives at a destination for the vehicle 1, which is set by the occupant. The automatic driving/driving assist ECU 14 may acquire information on the speed and the acceleration of the vehicle 1 and the images of the outer cameras 33 from the detection ECU 16 through the vehicle network 26, and output control information for safety traveling to the vehicle network 26. The drive ECU 11, the steering ECU 12, and the brake ECU 13 may acquire the control information for the safety traveling from the vehicle network 26, and control the traveling of the vehicle 1.

The operation ECU 20 may acquire various kinds of information from the detection ECU 16 and the automatic driving/driving assist ECU 14 through the vehicle network 26, and cause the display device to display the various kinds of information thus acquired. In a case where the occupant operates the operation device with respect to the various kinds of information displayed by the display device, the operation ECU 20 may output the input information for the operation device to the vehicle network 26. The detection ECU 16 and the automatic driving/driving assist ECU 14 may acquire the input information through the vehicle network 26, and execute a control based on the acquired input information.

An inner camera 34 may be coupled to the occupant monitoring ECU 18. The occupant monitoring ECU 18 may identify the occupant who is present in the vehicle 1 on the basis of the image captured by the inner camera 34, and monitor a riding state of the occupant. The captured image and an identification result may be information regarding the occupant. Hereinafter, the information regarding the occupant is referred to as "occupant information." The occupant monitoring ECU 18 may output the occupant information to the vehicle network 26. The operation ECU 20 may acquire the occupant information from the occupant monitoring ECU 18 through the vehicle network 26, and cause the display device to display the occupant information. In a case where the occupant operates the operation device with respect to the occupant information displayed by the display device, the operation ECU 20 may output the input information for the operation device to the vehicle network 26. The occupant monitoring ECU 18 may acquire the input information through the vehicle network 26, and execute a control based on the acquired input information.

The air-conditioning ECU 17 may control environment such as temperature or humidity of the vehicle compartment 3. The air-conditioning ECU 17 may output in-vehicle information on temperature, an amount of solar radiation, humidity, or any other factor detected by an unillustrated sensor such as a temperature sensor to the vehicle network 26. The operation ECU 20 may acquire the in-vehicle information from the air-conditioning ECU 17 through the vehicle network 26, and cause the display device to display the acquired in-vehicle information. In a case where the occupant operates the operation device with respect to the in-vehicle information displayed by the display device, the operation ECU 20 may output the input information for the operation device to the vehicle network 26. The air-conditioning ECU 17 may acquire the input information through the vehicle network 26, and execute a control based on the acquired input information.

The external communication ECU 19 may communicate wirelessly with any of a communication base station 81 existing outside the vehicle 1 and a communication device of another vehicle 82, for example. The communication base station 81 and the communication device of the other vehicle 82 may be included in a transportation system 80 together with a server apparatus 83. The external communication ECU 19 may receive information on the transportation system 80 from the communication base station 81 or the communication device of the other vehicle 82, and output the information to the vehicle network 26. The operation ECU 20 may acquire the information received by the external communication ECU 19 through the vehicle network 26, and cause the display device to display the information. In a case where the occupant operates the operation device with respect to the information displayed by the display device, the operation ECU 20 may output the input information for the operation device to the vehicle network 26. The external communication ECU 19 may acquire the input information through the vehicle network 26, and transmit the input information to the communication base station 81 or the communication device of the other vehicle 82 by wireless communication. The transmitted information may be utilized by the server apparatus 83 or the other vehicle 82 in the transportation system 80, for example. This makes it possible for the operation ECU 20 of the vehicle 1, for example, to transmit and receive the information or data to and from the server apparatus 83 of the transportation system 80 and the other vehicle 82 through the external communication ECU 19.

Further, the control system 10 illustrated in FIG. 2 may be configured to operate by supplying of electric power from a battery 91 provided in the vehicle 1 to each of the units. Power supply lines from the battery 91 to the respective units may be spread all over the vehicle 1 together with communication cables for the vehicle network 26, for example. Electric power may be supplied to the control system 10 from a power generator or a power receiving device in addition to the battery 91.

Thus, the operation ECU 20 may be coupled to the other control devices including each of the ECUs through the vehicle network 26 of the vehicle 1, whereby it is possible for the operation ECU 20 to transmit and receive the information or data to and from the other control devices. Further, in FIG. 2, the control ECUs other than the operation ECU 20 may be two or more control devices configured to control the vehicle 1. The external communication ECU 19 may be, however, configured to communicate with the outside of the vehicle 1.

Various kinds of devices and operating members thereof may be provided in the vehicle 1 as described above. For example, the operating members such as the start switch, the handle 5, the shift lever 6, the brake pedal 7, and the accelerator pedal 8 directed to controlling of the traveling of the vehicle 1 may be provided in the vehicle 1. Further, operating members for an air conditioner, a navigation apparatus, an audio device, an image receiving device, a handsfree calling device, and other equipment devices may also be provided in the vehicle 1 in addition to the operating members for the devices described above. Thus, a large number of operating members may be provided in the vehicle 1. The large number of operating members may be laid out on an inner surface of the vehicle compartment 3. However, in recent years, the inner surface for layout of the vehicle compartment 3 tends to become insufficient. For example, in a case where it is considered that a game machine, a network communication device, an entertainment device, or any other device may be added thereto, there is a possibility that operating members for these devices cannot further be added in the future.

In particular, for the vehicle 1, development of an automatic driving technique has advanced. In a case where the development advances actually and the vehicle 1 can travel autonomously without the occupant directly controlling the traveling of the vehicle 1, as illustrated in FIG. 1C, the occupant may possibly ride the vehicle 1 in a state where the seat 4 is reclined, for example. In this case, when the occupant wants to operate any operating apparatus, the occupant may be required to rise from the seat 4 for an operation and stretch his or her arm to the operating member such as the handle 5 laid out on the inner surface of the vehicle compartment 3 to operate the operating member.

For this reason, development of a new operating apparatus directed to operating of an image projected in the vehicle compartment 3 of the vehicle 1 may be required for the vehicle 1, for example. Hereinafter, for example, a projected object is referred to as an "image object." For example, the non-contact operating apparatus 40 may be considered as such an operating apparatus. The non-contact operating apparatus 40 may project an image in a space in front of the occupant who sits on the seat 4. The non-contact operating apparatus 40 may generate input information in response to an operation of the occupant against an image object in the projected image, and output the generated input information to the vehicle network 26. Further, in one example, the non-contact operating apparatus 40 may output a tactile stimulation based on an ultrasound field to an operation site of the occupant in response to the operation of the occupant against the projected image object. By acquiring the response by such a tactile stimulation, the occupant may be allowed to obtain an actual sensation of the operation despite a non-contact operation against the image object projected in the space within the vehicle compartment 3 in the similar manner that the occupant actually performs the operation against a substantial object.

However, the occupant may not necessarily sit on the seat 4 as illustrated in FIG. 1B with a driving posture with which the occupant is allowed to operate the operating member directed to traveling such as the handle 5 provided in the vehicle 1.

For example, as illustrated in FIG. 1C, the occupant may be present in the vehicle 1 in the reclining state in which the occupant reclines the seat 4 to be relaxed.

In this case, even though the image is projected at a projected position, illustrated in FIG. 1(B), which is located in front of the occupant with the driving posture and at which the image object is reachable and operable by the occupant's hand, the operation site of the occupant cannot reach the image object by stretching the hand. Hereinafter, the projected position at which the image object is operable by the occupant with the driving posture is referred to as a "standard projected position." Namely, the occupant who is relaxed by reclining the seat 4 cannot reach the image object projected at the standard projected position even by stretching the hand unless the occupant puts his or her upper body up from the seat 4.

Thus, it is required to further improve the operating apparatus of the vehicle 1.

Figure 3:
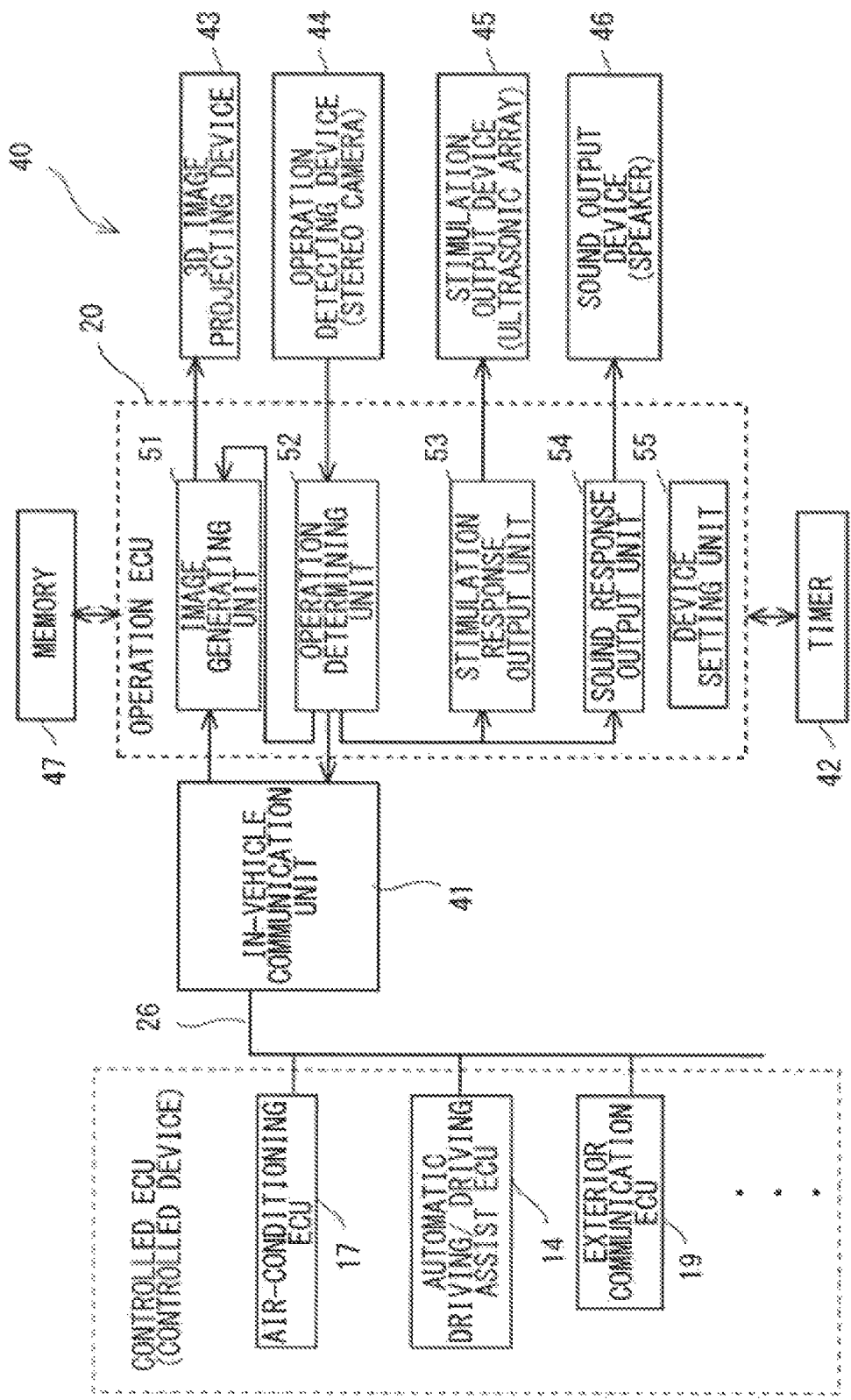
FIG. 3 is a block diagram illustrating an example of a configuration of a non-contact operating apparatus to be provided in the vehicle illustrated in FIG. 1.

FIG. 3 is a block diagram illustrating a configuration of the non-contact operating apparatus 40 to be provided in the vehicle 1 illustrated in FIG. 1.

The non-contact operating apparatus 40 illustrated in FIG. 3 may include, for example but not limited to, an in-vehicle communication unit 41, a timer 42, a 3D image projecting device 43, an operation detecting device 44, a stimulation output device 45, a sound output device 46, a memory 47, and the operation ECU 20 to which aforementioned devices are coupled.

The memory 47 may be a non-volatile memory, for example, and may be coupled to the operation ECU 20. Programs and data for the non-contact operating apparatus 40 may be stored in the memory 47. In one example, the programs may be ones in which processes are executed by artificial intelligence (AI). In one example, the programs may include a learning program for AI processing. The data may contain, for example but not limited to, three-dimensional model data for an image to be projected during a non-contact operation. The three-dimensional model data may be image data for the non-contact operation, and contain a plurality of pieces of polygon data that is to be included in a surface of the model, for example.

For example, the operation ECU 20 may be a central processing unit (CPU), or a microcomputer such as an application specific integrated circuit (ASIC) or a digital signal processor (DSP). The operation ECU 20 may read out a program for the non-contact operation from the memory 47, and execute the program. This may implement a control unit of the non-contact operating apparatus 40 in the operation ECU 20. The control unit of the non-contact operating apparatus 40 may control a general operation of the non-contact operating apparatus 40, and implement various kinds of performance for the non-contact operation in the non-contact operating apparatus 40. For example, the operation ECU 20 may implement, as the various kinds of performance for the non-contact operation, an image generating unit 51, an operation determining unit 52, a stimulation response output unit 53, a sound response output unit 54, and a device setting unit 55.

The in-vehicle communication unit 41 may be coupled to the vehicle network 26. As illustrated in FIG. 3, the in-vehicle communication unit 41 may transmit and receive information or data to and from the other control ECU such as the air-conditioning ECU 17, the automatic driving/driving assist ECU 14, or the external communication ECU 19 through the vehicle network 26, for example. For example, the in-vehicle communication unit 41 may acquire a display instruction for air conditioning operation image from the air-conditioning ECU 17, and output the display instruction to the operation ECU 20. The in-vehicle communication unit 41 may acquire a display instruction of setting an operation image for automatic driving/driving assist from the automatic driving/driving assist ECU 14, and output the display instruction to the operation ECU 20. The in-vehicle communication unit 41 may acquire content data such as the three-dimensional model data from the external communication ECU 19, and output the acquired content data to the operation ECU 20.

The timer 42 may measure an elapsed time or a time. The elapsed time or the time measured by the timer 42 may be outputted to the operation ECU 20.

The image generating unit 51 generates and updates an image to be projected by the 3D image projecting device 43. In a specific but non-limiting example, the image generating unit 51 may acquire the three-dimensional model data from the memory 47 or the in-vehicle communication unit 41 on the basis of the display instruction inputted from the in-vehicle communication unit 41 in order to generate data of an image to be projected. The image generating unit 51 may generate a three-dimensional model from the acquired three-dimensional model data. The image generating unit 51 may determine a projected position and a direction of the three-dimensional model in the vehicle compartment 3 viewed from the occupant, and generate image data for projection from the three-dimensional model (or a stereoscopic model.) The image generating unit 51 may output the image data for projection to the 3D image projecting device 43. In one example, the image generating unit 51 may generate a two-dimensional model (or a planar model) from two-dimensional model data, and generate image data for projection. It is to be noted that, also in a case where a display instruction is not inputted from the in-vehicle communication unit 41, the image generating unit 51 may acquire the content data such as a moving image or a still image from the memory 47 or the in-vehicle communication unit 41, generate image data of the content as a three-dimensional image (stereoscopic image) or a two-dimensional image (planar image), and output the image data to the 3D image projecting device 43.

The 3D image projecting device 43 projects the 3D (three-dimensional) image or the 2D (two-dimensional) image, which is operable by the occupant, to a space, that is, a predetermined display region, within the vehicle compartment 3 of the vehicle 1. The 3D image projecting device 43 may be a display device or a projector, for example. The 3D image projecting device 43 may project an image to a hollow space within the vehicle compartment 3 by a hologram system or a mirror system, for example. The 3D image projecting device 43 may be disposed at a position in front of the seat 4 on which the occupant sits, for example but not limited to, on a dashboard, a rearview mirror, a back mirror, or a roof of the vehicle compartment 3. The 3D image projecting device 43 projects the 3D (three-dimensional) image or the 2D (two-dimensional) image to the space within the vehicle compartment 3 of the vehicle 1. Thus, the stereoscopic image may be projected to the projected position of the vehicle compartment 3 so that the occupant is allowed to visually recognize the three-dimensional model.

The operation detecting device 44 may detect a predetermined operation site of the occupant. In one example embodiment, the operation detecting device 44 may detect a riding state or a sitting state of the occupant who is present in the vehicle 1. In one example, the operation detecting device 44 may detect the operation site of the occupant who performs the non-contact operation against the image object of the image projected in the space within the vehicle compartment 3. The non-contact operation may include, for example but not limited to, a hand operation against the image object and a movement operation to move the image object. In one example, the operation detecting device 44 may be disposed at a position in front of the seat 4 on which the occupant sits, for example but not limited to, on the dashboard, the rearview mirror, the back mirror, or the roof of the vehicle compartment 3, for example. In a case where the inner camera 34 as an occupant monitoring apparatus is disposed at a location such as on the dashboard, the rearview mirror, or the back mirror, the operation detecting device 44 may also be used as the inner camera 34. The operation detecting device 44 may include a stereo camera 63 in which two imaging devices are arranged side by side, for example. In this case, the operation detecting device 44 may detect, by the images of the two imaging devices, an operation by a predetermined operation site of the occupant against an image projected in midair of the vehicle compartment 3. Hereinafter, the aforementioned operation by the predetermined operation site of the occupant may be referred to also as an "operation of the occupant," and the aforementioned image projected in midair of the vehicle compartment 3 may be referred to also as a "projected image."

The operation determining unit 52 may acquire detected information such as the image of the stereo camera 63 from the operation detecting device 44, for example, and determine the non-contact operation of the occupant against the image object in the image projected in the space within the vehicle compartment 3 on the basis of the detected information. The operation determining unit 52 may determine, for example, a position and motion of the operation site of the occupant as the operation of the occupant against the image object projected in the space within the vehicle compartment 3. The motion may include information on motion of the operation site, such as a direction, a speed, or an acceleration of movement. The operation determining unit 52 may acquire a pixel position including a feature of a fingertip of the occupant from the image by AI processing, for example, and generate positional information on the fingertip by a triangulation method for the image of the stereo camera 63. The operation determining unit 52 may generate information on motion of the fingertip, for example, a movement direction, a movement speed, an acceleration of the movement from an imaging result obtained by shifting a time. The operation determining unit 52 may determine, for example, the position and the motion of the operation site of the occupant on the basis of the projected position of the image object, and determine the operation of the occupant against the image object projected in the space within the vehicle compartment 3. The operation determining unit 52 may determine, for example but not limited to, presence or absence of contact of the operation site of the occupant against the projected image object, a remaining distance to contact, and a depth to contact. Information related to the presence or absence of contact of the operation site of the occupant against the projected image object, the remaining distance to contact, the depth to contact, and any other suitable information may be hereinafter referred to as "operational information." The operation determining unit 52 may output the determined operational information to the respective units of the operation ECU 20. Namely, the operation determining unit 52 may output the operational information to the image generating unit 51, the stimulation response output unit 53, the sound response output unit 54, and the device setting unit 55, for example. In one embodiment, the operation determining unit 52 and the operation detecting device 44 may serve as a "detecting device." The image generating unit 51 updates the image data for projection in response to the operation of the occupant, and may output the updated image data to the 3D image projecting device 43. Thus, the image to be projected by the 3D image projecting device 43 in the predetermined display region within the vehicle compartment 3 is updated in response to the operation of the occupant.

Further, in a case where it is determined that the operation of the occupant against the image object projected in the space within the vehicle compartment 3 is performed, on the basis of the determined operational information, the operation determining unit 52 may output input information based on the operation of the occupant to the respective ECUs of the vehicle 1 through the in-vehicle communication unit 41. For example, in a case where an operation button directed to varying of set temperature of the air conditioner is operated by the occupant in a state where the operation button is projected as the image object, the operation determining unit 52 may generate input information corresponding to the operation button, and output the generated input information to the in-vehicle communication unit 41. The in-vehicle communication unit 41 may output the input information to the air-conditioning ECU 17 as the control device through the vehicle network 26. The air-conditioning ECU 17 may vary target set temperature for the air conditioner on the basis of the input information, and so execute an air-conditioning control that the temperature in the vehicle compartment 3 becomes the target set temperature.

Figure 4:
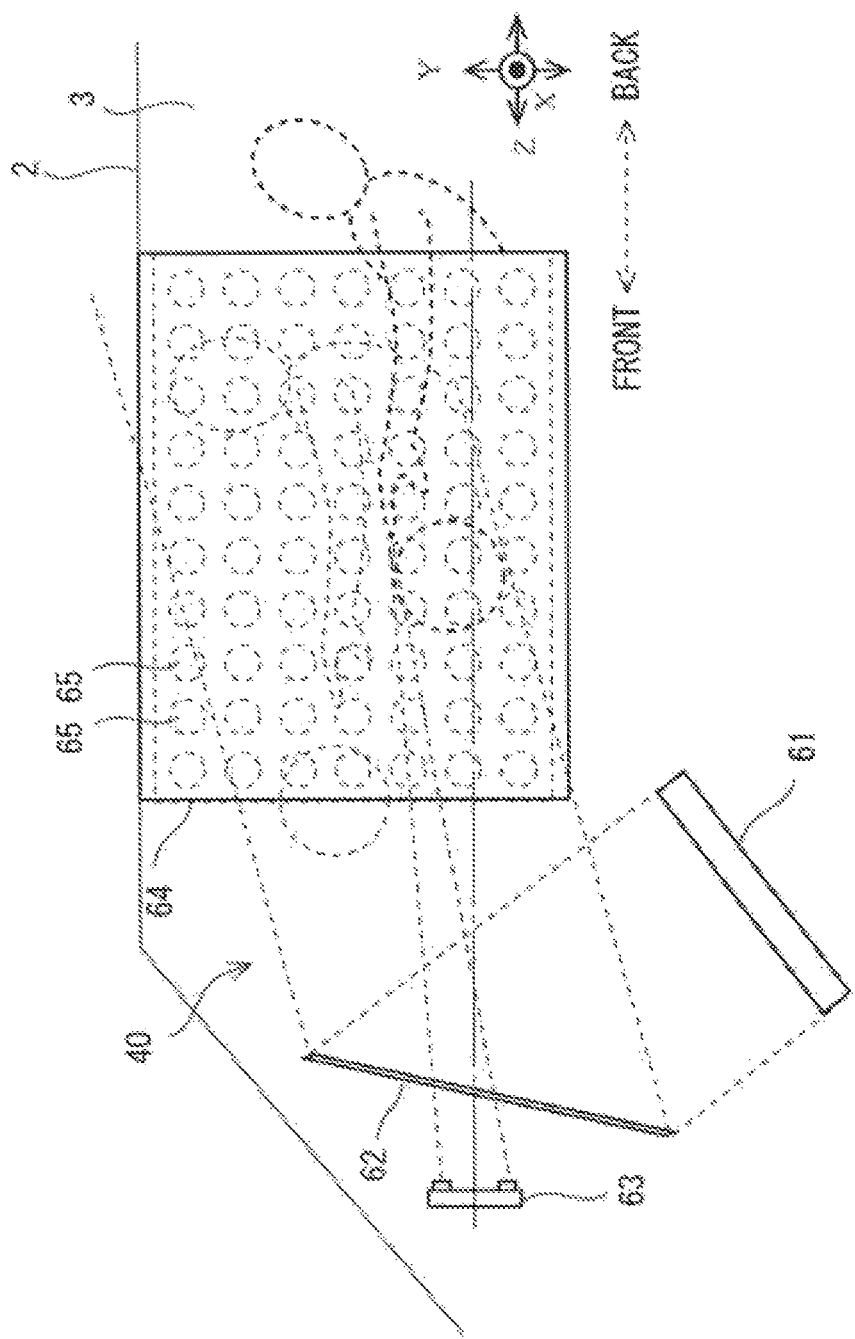
FIG. 4 is an explanatory diagram illustrating an example of arrangement of main components of the non-contact operating apparatus illustrated in FIG. 3 in a vehicle compartment.

The stimulation output device 45 may be any device that is configured to output, for example, by an electrical signal, a tactile stimulation to the operation site of the occupant who operates against the image object. As a device that gives a tactile sensation without contact, there is one that generates a field of ultrasound waves and gives a tactile sensation to a skin of an operation site by applying the field of ultrasound waves or variation on the field to the operation site of the occupant, for example. In one example, the stimulation output device 45 may include an element array in which a plurality of ultrasonic elements 65 is arranged in a planar manner as illustrated in FIG. 4, for example. The stimulation output device 45 may be provided at a position apart from and under the operation site, such as the hand, of the occupant who is present in the vehicle compartment 3, for example. By selectively outputting the ultrasound waves from the plurality of ultrasonic elements 65, it is possible to generate a tactile sensation to a local site of the hand of the occupant, for example, the fingertip, as if a skin of the fingertip of the occupant is touching an object.

The stimulation response output unit 53 may cause the stimulation output device 45 to output the tactile stimulation based on the ultrasound field to the operation site of the occupant who operates the projected image object. Namely, the stimulation response output unit 53 may cause the stimulation output device 45 to output the tactile stimulation as a response to the operation of the occupant against the image object. The stimulation response output unit 53 may output an electrical signal to the stimulation output device 45, and cause one or more of the plurality of ultrasonic elements 65 to selectively output ultrasound waves based on the operation. Thereby, the stimulation response output unit 53 is allowed to generate an ultrasound field in a predetermined region within the vehicle compartment 3. The stimulation response output unit 53 may locally apply the field of the ultrasound waves or the variation on the field to the operation site of the occupant that is determined to be in contact with the image object by the operation determining unit 52. Here, when a person puts his or her hand into an ultrasound field, for example, the person is allowed to feel the ultrasound field by a skin of a surface of the hand. Thereby, the stimulation response output unit 53 may be able to cause the stimulation output device 45 to output, as a response to the operation, a stimulation of a tactile sensation by the ultrasound field to the operation site of the occupant that performs the non-contact operation against the image object projected in the space within the vehicle compartment 3. The stimulation response output unit 53 may locally apply the field of the ultrasound waves or the variation on the field to a surface of the image object with which the operation site of the occupant is virtually in contact, for example.

In addition, for example, in one example, the stimulation output device 45 may include an element array in which a plurality of pressure output elements is arranged. In this case, the stimulation response output unit 53 may control operations of the plurality of pressure output elements separately, whereby a pressure acts on the skin of the person. This makes it possible for the occupant to obtain feeling based on the operation.

The sound output device 46 may be a speaker, for example. The speaker may be driven by a sound signal. The sound output device 46 may output a sound based on the operation of the occupant, for example. It may be sufficient that the sound output device 46 is arranged in the vehicle compartment 3.

The sound response output unit 54 may output a sound signal to the sound output device 46 to output a sound based on the operation from the sound output device 46. The sound response output unit 54 may select and acquire audio data recorded in the memory 47 in response to the operation of the occupant, and output a sound signal generated from the acquired audio data to the speaker as the sound output device 46. This allows the occupant to hear various kinds of sounds based on the operation.

The device setting unit 55 may execute settings for the non-contact operating apparatus 40. For example, the device setting unit 55 may output a corresponding set value to each of the units such as the image generating unit 51, the operation determining unit 52, the stimulation response output unit 53, and the sound response output unit 54, or give an instruction related to a corresponding setting.

The device setting unit 55 may determine a position at which the image is to be projected on the basis of the riding state or the sitting state of the occupant detected by the operation detecting device 44. The device setting unit 55 may determine the projected position of the image within a range of an operation region in which the stimulation response output unit 53 can cause the stimulation output device 45 to output the stimulation to the operation site of the occupant. The device setting unit 55 instructs the image generating unit 51 to project the image at the projected position. The image generating unit 51 may control the 3D image projecting device 43 to project the image at the instructed projected position. The device setting unit 55 may instruct the operation determining unit 52 to detect an operation by the operation site of the occupant around the projected position. The operation determining unit 52 may control the operation detecting device 44 to detect the operation of the operation site. In one example, the device setting unit 55 may instruct the stimulation response output unit 53 to output a tactile stimulation to the operation site of the occupant that is present around the projected position. The stimulation response output unit 53 may control the stimulation output device 45 to output the tactile stimulation to the operation site of the occupant. Thereby, for example, the image generating unit 51 is allowed to project the image containing the image object at the position at which the operation determining unit 52 is able to determine the operation by the operation site of the occupant.

FIG. 4 is an explanatory diagram of one example of arrangement of main components of the non-contact operating apparatus 40 illustrated in FIG. 3 in the vehicle compartment 3.

FIG. 4 schematically illustrates one example of a specific but non-limiting combination of the 3D image projecting device 43, the operation detecting device 44, and the stimulation output device 45, which are illustrated in FIG. 3.

As a specific but non-limiting example, FIG. 4 illustrates a display screen 61 and a half mirror 62 as the 3D image projecting device 43. FIG. 4 also illustrates the stereo camera 63 as the operation detecting device 44. FIG. 4 also illustrates an element array as the stimulation output device 45. The aforementioned main components of the non-contact operating apparatus 40 may be provided within the vehicle compartment 3 of the vehicle 1.

Further, FIG. 4 also illustrates both an occupant with a driving posture and an occupant who is in a reclining state in which the seat 4 is reclined.

The stimulation output device 45 may have the hollow square frame body 64. An element array in which the plurality of ultrasonic elements 65 is regularly arranged, for example, may be provided on each of four surfaces of the square frame body 64. By appropriately causing the element arrays provided on upper, lower, right, and left surfaces of the square frame body 64 to operate, as illustrated in FIG. 4, an ultrasound field may locally act on a fingertip entering the inside of the square frame body 64. This makes it possible for the occupant to obtain a tactile sensation as if the fingertip is touched by something.

The half mirror 62 may be provided in front of the hollow square frame body 64 of the stimulation output device 45. The half mirror 62 may be so provided as to face the occupant. The display screen 61 configured to display a three-dimensional image (stereoscopic image) or a two-dimensional image (planar image) may be disposed under the half mirror 62. The image displayed on the display screen 61 may be reflected by the half mirror 62, whereby the occupant may be allowed to visually recognize the three-dimensional image (stereoscopic image) or the two-dimensional image (planar image) inside the hollow square frame body 64 in the stimulation output device 45. The occupant may be allowed to visually recognize the image projected inside the hollow square frame body 64 in the stimulation output device 45 and in midair within the vehicle compartment 3. In the example embodiment, the occupant may be allowed to visually recognize that a sphere indicated by a circle in FIG. 4 as the three-dimensional image is floating inside the hollow square frame body 64.

The stereo camera 63 may be provided on the opposite side of the half mirror 62 with respect to the stimulation output device 45, for example. In this case, the two imaging devices of the stereo camera 63 may be allowed to capture, for example, a finger of the occupant that is present inside the square frame body 64. Thereby, the stereo camera 63 may be allowed to capture an image of, for example, the finger of the occupant that enters the hollow square frame body 64 of the stimulation output device 45. Hereinafter, as needed, on the basis of FIG. 4, a direction from an axial center of the square frame body 64 toward the occupant may be referred to as a Z direction, and directions perpendicular to the Z direction may be referred to as a Y direction and an X direction. Here, the Z direction may usually become a direction along a front-back direction of the vehicle 1.

It is to be noted that components of the non-contact operating apparatus 40 illustrated in FIG. 3 are not necessarily arranged so as to be crowded as illustrated in FIG. 4.

For example, in a case where the hollow square frame body 64 of the stimulation output device 45 is arranged in front of the occupant, the hollow square frame body 64 may become an encumbrance to an operation when the occupant operates the operating member such as the handle 5. As illustrated in FIG. 1, the hollow square frame body 64 may be provided in a square frame shape along peripheral surfaces of the vehicle body 2. In this case, any structural object such as the square frame body 64 may not be provided in front of the seat 4 on which the occupant sits. Also in this case, as illustrated in FIG. 4 by dotted circles as spherical images, the 3D image projecting device 43 may be allowed to project an image in a space inside the hollow square frame body 64 provided within the vehicle compartment 3, for example. The occupant may be allowed to perform the non-contact operation against the image object by operating the image object in the operation region inside the square frame body 64. The hollow square frame body 64 may not necessarily have a square frame shape. The element array may merely be arranged along the peripheral surfaces of the vehicle body 2. In an alternative example, the element array may be disposed on the inner surface of the vehicle compartment 3 as a whole.

The half mirror 62 may basically be so provided as to oppose the occupant with the hollow square frame body 64 of the stimulation output device 45 in between. Further, if the image is merely projected in midair inside the square frame body 64, a fully-reflective mirror may be used in place of the half mirror 62. Further, in one example, the display screen 61 itself may be disposed at a position opposing the occupant with the hollow square frame body 64 of the stimulation output device 45 in between. In this case, the half mirror 62 or the fully-reflective mirror may not be required. In one example, the half mirror 62 or the fully-reflective mirror and the display screen 61 may be disposed on the dashboard, the rearview mirror, or the roof, for example. Further, the half mirror 62 or the fully-reflective mirror and the display screen 61 may be integrated with the occupant monitoring apparatus.

The operation detecting device 44 such as the stereo camera 63 may be arranged on the dashboard, the rearview mirror, or the back mirror, for example. Further, the operation detecting device 44 may be used as an imaging device of the occupant monitoring apparatus such as a display management system (DMS). The operation detecting device 44 such as the stereo camera 63 may be any device as long as the device is able to capture an image of an operation site such as the fingertip of the occupant. Further, a detected medium for the operation detecting device 44 is not limited to an image. For example, the inside of the vehicle compartment 3 may be scanned by laser, and a site such as a fingertip of the occupant may be detected on the basis of a scanning result.

Figure 5:
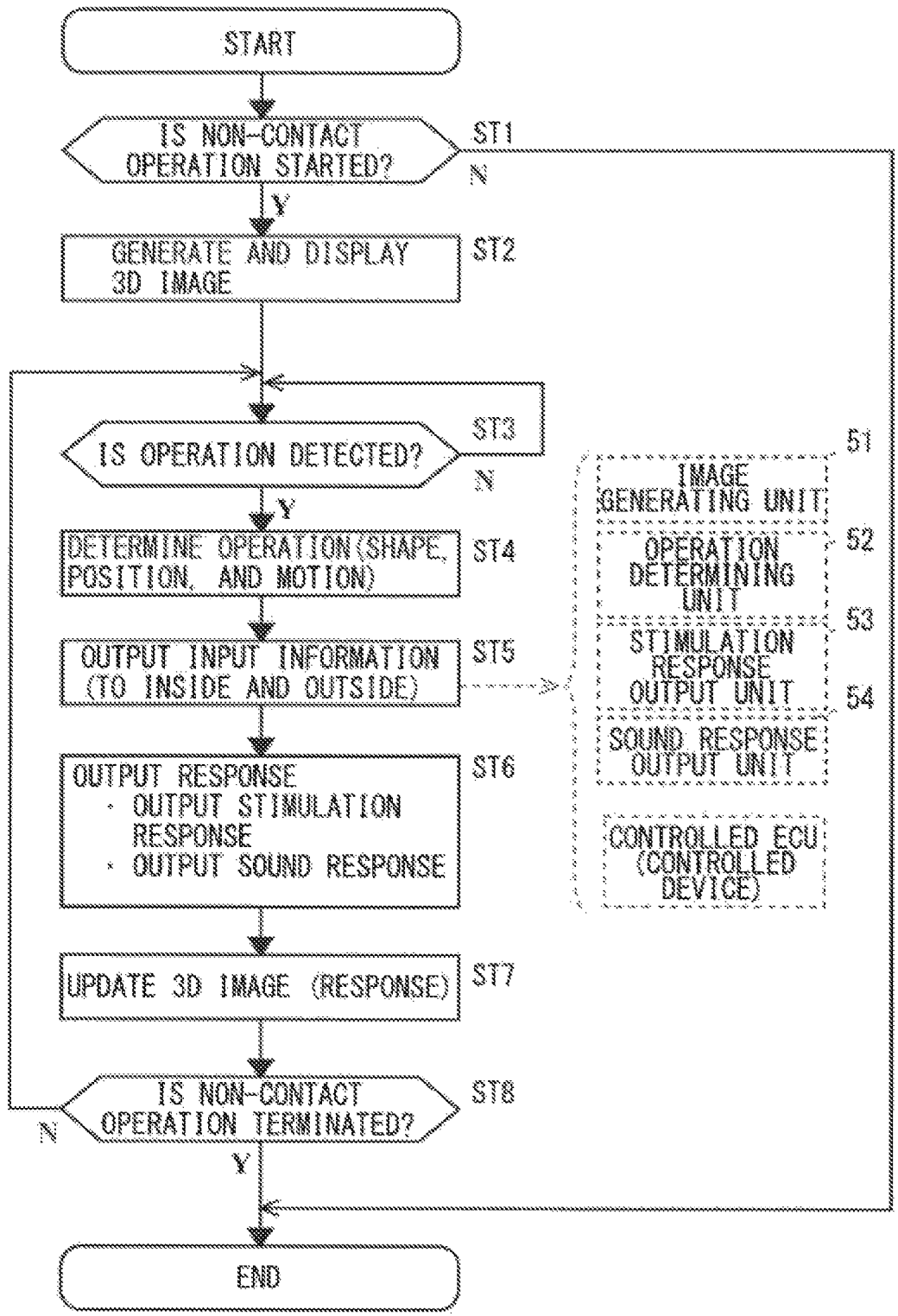
FIG. 5 is a flowchart illustrating an example of a flow of non-contact operation processing executed by the non-contact operating apparatus illustrated in FIG. 3.

FIG. 5 is a flowchart illustrating a flow of non-contact operation processing executed by the non-contact operating apparatus 40 illustrated in FIG. 3.

In Step ST1, the operation ECU 20 may determine whether a non-contact operation by projecting an image is to be started. For example, in a case where a display instruction is inputted from any ECU or in a case where there is the content to be displayed, the operation ECU 20 may determine that the non-contact operation is to be started (Y in Step ST1), and cause the processing flow to proceed to Step ST2. Otherwise, the operation ECU 20 may determine that the non-contact operation is not to be started (N in Step ST1), and terminate the non-contact operation processing illustrated in FIG. 5.

In Step ST2, the operation ECU 20 generates, as the image generating unit 51, an initial 3D image, and may cause the 3D image projecting device 43 to display the 3D image. First, the operation ECU 20 may generate a three-dimensional model from three-dimensional model data acquired from the memory 47 or the in-vehicle communication unit 41, and further generate image data for projection.

The operation ECU 20 may generate the image data for projection from the three-dimensional model on the basis of settings of an initial projected position and an initial display direction of the image which are set for the three-dimensional model in advance. In one example, the operation ECU 20 may temporarily store the generated three-dimensional model in the memory 47. In this case, the operation ECU 20 may read out the three-dimensional model from the memory 47 in a next generating process directed to updating of the image. This makes it possible to generate the image data for projection. The operation ECU 20 may output the generated image data for projection to the 3D image projecting device 43. The 3D image projecting device 43 projects an image based on the image data for projection in a space within the vehicle compartment 3. Thereby, for example, in a case where the initial projected position is the standard projected position, as illustrated in FIG. 4, the three-dimensional model may be displayed at the standard projected position in front of the occupant in a predetermined display direction. The standard projected position refers to a position at which the image is projected in front of the occupant with the driving posture. In a case, for example, where the three-dimensional model has orientation, the predetermined display direction may be so set that a front surface of the three-dimensional model is directed toward the occupant, for example. The occupant with the driving posture may be allowed to touch the image object by stretching his or her hand as it is.

In Step ST3, the operation ECU 20 may determine, as the operation determining unit 52, whether an operation of the occupant against an image object in the image is detected. The operation of the occupant may be acquired from the operation detecting device 44. The operation ECU 20 may acquire detected information such as an image of the stereo camera 63 from the operation detecting device 44, for example, and extract a predetermined operation site of the occupant such as a fingertip of the occupant, for example. The operation ECU 20 may thereafter detect the operation of the occupant against the image object on the basis of variation of a position of the predetermined operation site in the vehicle compartment 3 or presence or absence of motion thereof, for example. In the detection of the operation at this point, the operation ECU 20 may determine that the operation of the occupant against the image is detected even though the operation site of the occupant does not operate the image object. In a case where the operation of the occupant against the image object is not detected (N in Step ST3), the operation ECU 20 may repeat this determination process in Step ST3. In a case where the operation of the occupant against the image object is detected (Y in Step ST3), the operation ECU 20 may cause the processing flow to proceed to Step ST4.

In Step ST4, the operation ECU 20 may determine, as the operation determining unit 52, the operation of the occupant against the image object. The operation ECU 20 may first determine whether the operation site of the occupant is in a state where the operation site is in contact with the image object, on the basis of a projected position of a surface of the projected image. In a case where it is determined that the operation site is in the state where the operation site is in contact with the image object, the operation ECU 20 may further determine a contact shape, a position and motion (including a direction and a speed) of the operation site. The contact shape may be the number of fingers that are in contact with the image object, or a position of the hand, for example. Moreover, the operation ECU 20 may determine, on the basis of the projected position of the surface of the projected image, a remaining distance until the operation site comes into contact with the image object, or a depth at which the operation site is in contact with the image object, for example.

Further, in a case where it is determined that the operation of the occupant is made against a predetermined image portion, such as a button, of the image object projected in the space within the vehicle compartment 3, on the basis of the operational information determined in this manner, for example, the operation ECU 20 may generate input information on the operation of the occupant.

In Step ST5, the operation ECU 20 may output, as the operation determining unit 52, the determined operational information on the operation of the occupant and the input information on the operation to inside and outside of the operation ECU 20. The operation ECU 20 may output the operational information to the image generating unit 51, the stimulation response output unit 53, and the sound response output unit 54 in the operation ECU 20. Further, the operation ECU 20 may output the input information to each of the control ECUs of the plurality of control devices provided in the respective units of the vehicle 1 through the in-vehicle communication unit 41.

In Step ST6, the operation ECU 20 may output a tactile stimulation, a sound, or both as a response to the operation on the basis of the operational information.

The operation ECU 20 may specify, as the stimulation response output unit 53, a position of the operation site of the occupant in the state of being in contact with the image object, on the basis of the operational information. The operation ECU 20 may thereafter select the plurality of ultrasonic elements 65 that is to output ultrasound waves so that the ultrasound waves are outputted toward the specified position, and output an electrical signal to the stimulation output device 45. The stimulation output device 45 may output the ultrasound waves from the plurality of ultrasonic elements 65 thus selected. The occupant is allowed to obtain, on the basis of the response by the ultrasound waves, a tactile sensation as if the occupant operates the image object.

The operation ECU 20 may select, as the sound response output unit 54, audio data from the memory 47 in accordance with the motion of the operation site of the occupant, which is in a state where the operation site is in contact with the image object specified on the basis of the operational information, and a contact portion between the operation site and the image object. Further, the operation ECU 20 may output a sound signal generated from the audio data to the sound output device 46. The sound output device 46 may output a sound based on the sound signal to the vehicle compartment 3. This makes it possible for the occupant to hear, as a response sound against the operation, a different sound based on the motion of the operation site of the occupant and the contact portion between the operation site and the image object.

In Step ST7, the operation ECU 20 updates, as the image generating unit 51, the image data to be projected for the response to the operation of the occupant, on the basis of the operational information. The operation ECU 20 may read out the three-dimensional model stored in the memory 47 to update the image data for projection, and output the updated image data to the 3D image projecting device 43. The 3D image projecting device 43 projects the updated image to the space within the vehicle compartment 3. This makes it possible for the occupant to visually recognize that the occupant oneself operates the image object by the operation site on the basis of variation in the projected image. The operation ECU 20 may so update the image data to be projected and the output of the stimulation that the image data to be projected and the output of the stimulation are synchronized with each other in accordance with the same operational information on the operation site of the occupant detected by the operation detecting device 44 and determined by the operation determining unit 52.

In Step ST8, the operation ECU 20 may determine whether the non-contact operation is to be terminated. For example, in a case where outputting of the input information based on the operation is completed, in a case where any new display instruction is not inputted, or in a case where the displayed content is to be terminated, the operation ECU 20 may determine that the non-contact operation is to be terminated (Y in Step ST8), and terminate the processing flow illustrated in FIG. 5. Otherwise (N in Step ST8), the operation ECU 20 may cause the processing flow to return to Step ST3. Thereby, the operation ECU 20 may repeat the processes from Step ST3 to Step ST8 until it is determined in Step ST8 that the non-contact operation is to be terminated. During these repeating processes, the operation ECU 20 may appropriately repeat the respective processes of the response by the stimulation to the operation site of the occupant, the response by the sound, and the response by the update of the projected image, in response to the operation of the occupant against the image object. Namely, when the projected image is updated in response to the operation, the operation ECU 20 may so vary the output of the tactile stimulation by the ultrasound field as to correspond to the updated projected image. The tactile stimulation by the ultrasound field may be so controlled synchronously as to follow update of the image.

Figure 6:
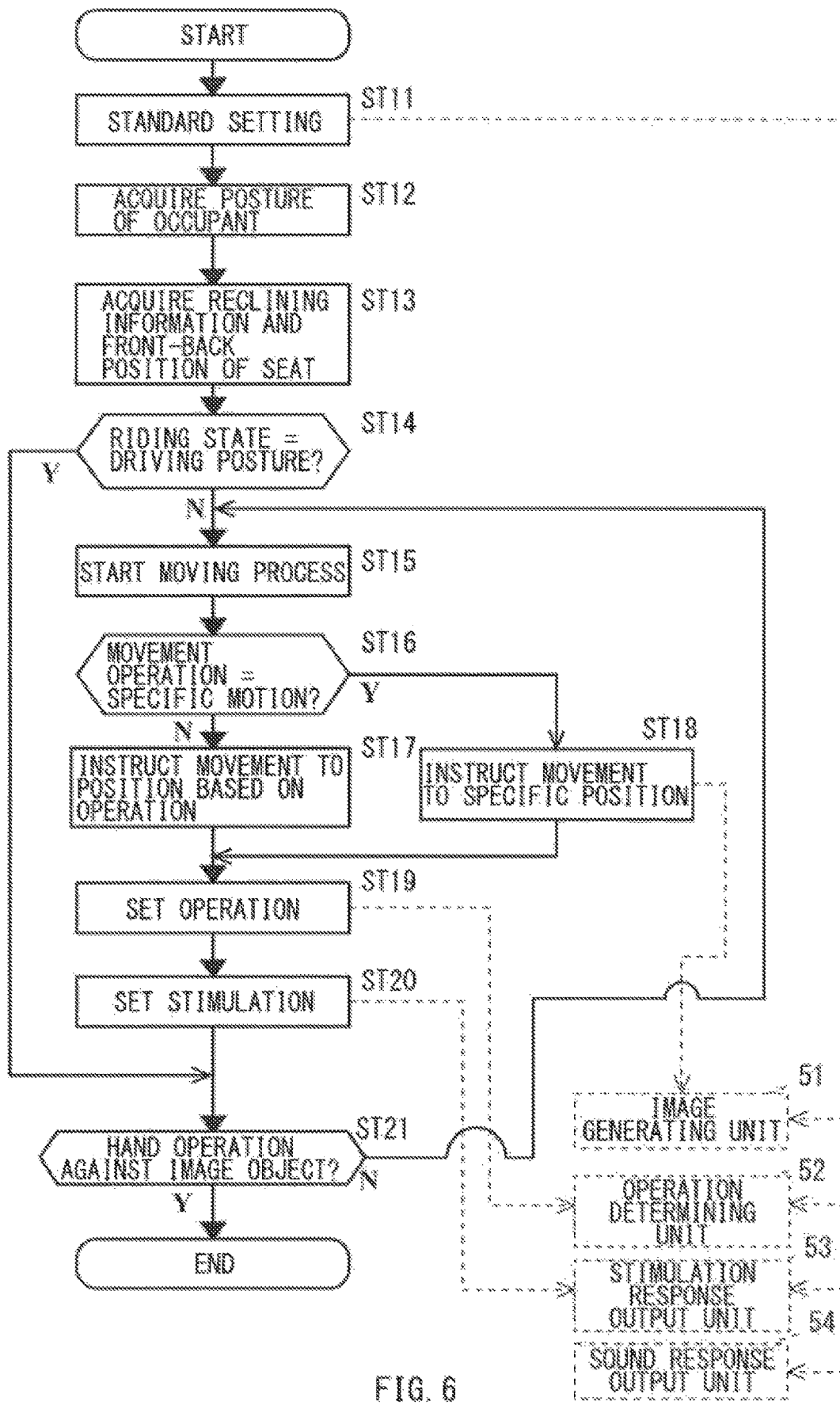
FIG. 6 is a flowchart illustrating an example of a flow of a projected position varying process executed by a device setting unit, which operates in the background of the flowchart illustrated in FIG. 5.

FIG. 6 is a flowchart illustrating an example of a flow of a projected position varying process executed by the device setting unit 55, which operates in the background of the flowchart illustrated in FIG. 5.

In Step ST11, the operation ECU 20 as the device setting unit 55 may execute standard setting for each device of the non-contact operating apparatus 40. The standard setting may be initial settings thereof.

The standard setting may refer to a setting under an assumption that the occupant sits on the seat 4 appropriately with the driving posture.

In the standard setting, the operation ECU 20 may instruct the image generating unit 51 to project the image to the standard projected position.

The operation ECU 20 may instruct the operation determining unit 52 to determine an operation of the occupant against the image object projected at the standard projected position.

The operation ECU 20 may instruct the stimulation response output unit 53 to prepare an output of a tactile stimulation to the operation site of the occupant who operates the image projected at the standard projected position.

In Step ST12, the operation ECU 20 may acquire detected information regarding a posture of the occupant from the operation detecting device 44 as information directed to determining of a riding state or a sitting state of the occupant.

The operation ECU 20 may acquire the image captured by the stereo camera 63 as the operation detecting device 44, for example.

In Step ST13, the operation ECU 20 may further acquire information on the seat 4 as information directed to determining of the riding state or the sitting state of the occupant. In a specific but non-limiting example, the operation ECU 20 may acquire reclining information on the seat 4 and information on a front-back position of the seat 4 from the steering ECU 12, for example. If the seat 4 is an electrically-operated seat, the steering ECU 12 may have control information for the seat 4. Further, if the seat 4 is a usual seat, the steering ECU 12 may hold the reclining information on the seat 4 and the information on the front-back position of the seat 4 as an output from an unillustrated sensor.

In Step ST14, the operation ECU 20 may determine, on the basis of the detected information acquired from a device or a unit such as the operation detecting device 44, the riding state or the sitting state of the occupant.

For example, the operation ECU 20 may determine whether the occupant is sitting on the seat 4 provided in the vehicle compartment 3 with the driving posture.

In a case where it is determined that the occupant is sitting on the seat 4 with the driving posture (Y in step ST14), the operation ECU 20 may cause the processing flow to proceed to Step ST21 without executing a moving process for the projected position of the image. In this case, the occupant may be sitting on the seat 4 with the driving posture with which the occupant is allowed to operate the operating member directed to traveling such as the handle 5 provided in the vehicle 1. The image generating unit 51 may continue to project the image at the standard projected position at which the occupant with this driving posture is allowed to operate the operating member.

In contrast, in a case where it is determined that the occupant is not sitting on the seat 4 with the driving posture (N in Step ST14), the operation ECU 20 may cause the processing flow to proceed to Step ST15.

For example, in a case where the seat 4 is positioned backward compared with a fixed position for the driving posture, in a case where the occupant deeply sits on the seat 4 compared with a sitting position for a usual driving posture, or in a case where the seat 4 is in the reclining state, the operation ECU 20 may determine that the occupant is not sitting on the seat 4 with the driving posture, and cause the processing flow to proceed to Step ST15.

In Step ST15, the operation ECU 20 may start the moving process for the projected position of the image in accordance with the riding state or the sitting state of the occupant.

In this case, the occupant is not sitting on the seat 4 with the driving posture, for example, as in a case where the occupant is in the reclining state to be relaxed, for example. The operation ECU 20 may start the moving process for the projected position of the image in order to vary the projected position of the image from the standard projected position to a position that is different from the standard projected position and at which the image object is operable by the occupant.

In Step ST16, the operation ECU 20 may determine whether specific motion of the occupant as a movement operation is detected. In one example, the operation ECU 20 may determine, on the basis of the image of the stereo camera 63 as the operation detecting device 44, whether the specific motion of the occupant is detected. As the specific motion, for example, there may be motion that the occupant lines up both palms to face the image object upward.

In a case where it is determined that the operation against the image object by the occupant such as the specific motion is started (Y in Step ST16), the operation ECU 20 may cause the processing flow to proceed to Step ST18.

In a case where it is determined that the operation against the image object by the occupant such as the specific motion is not started (N in Step ST16), the operation ECU 20 may cause the processing flow to proceed to Step ST17.

In Step ST17, the operation ECU 20 may instruct the image generating unit 51 to move the projected position of the image to a position based on the operation of the occupant.

The operation ECU 20 may calculate, for example, a movement direction and a movement amount of the projected position of the image in response to the operation of the occupant against the image object, and output information on, for example, the calculated movement direction and the calculated movement amount to the image generating unit 51. The image generating unit 51 may so update the image as to move the projected position of the image in the received movement direction by the received movement amount.

In Step ST18, the operation ECU 20 may instruct the image generating unit 51 to move the projected position of the image to a specific position. The specific position may be associated with the specific motion of the occupant in advance. The image generating unit 51 may so update the image as to project the image at this specific position.

For example, in a case where the specific motion of the occupant is the motion that the occupant lines up both palms to face the image object upward, the operation ECU 20 may set, as the device setting unit 55, a position above the both palms as the specific position, and instruct the image generating unit 51 to move the image. For example, in a case where the specific motion is motion that the occupant so lines up both palms in front of an abdominal region that the both palms face upward, the image may be projected in front of the abdominal region of the occupant. This makes it possible to move the projected position of the image on the basis of the specific motion. Thereby, the projected position of the image may not merely be moved to a place depending upon only a sitting posture of the occupant, but may be moved to any place intended by the occupant on the basis of the specific motion to project the image. This makes it possible to widen choices of the display content of the image. For example, even in a situation that the vehicle 1 is vibrated or shaken, the occupant may be allowed to move the image to a desired position by means of an easy operation based on the specific motion. Even if the vehicle 1 is vibrated or shaken, it is more difficult for the projected position of the image to be shifted from the desired position. By using the specific motion set in advance, the movement operation of the image by the occupant may become easier. In addition, by setting the above of the both palms to be the specific position and moving the image to the specific position to project the image, the occupant may be allowed to obtain similar operability to that when the occupant holds a cellular phone or a smartphone by one hand and operate the cellular phone or the smartphone.

It is to be noted that the example embodiment has been described on the assumption that the image generating unit 51 and the 3D image projecting device 43 are provided in the vehicle 1 by only one set. In an alternative example, a plurality of 3D image projecting devices 43 may be provided in the vehicle 1. In this case, the operation ECU 20 may select one from which the image is to be outputted from the plurality of 3D image projecting devices 43 in accordance with the projected position of the image, and instruct the selected 3D image projecting device 43 or the image generating unit 51 to move the image if needed.

In Step ST19, the operation ECU 20 may instruct the operation determining unit 52 to set operation determination based on the movement of the projected position of the image.

In Step ST20, the operation ECU 20 may instruct the stimulation response output unit 53 to set a stimulation output based on the movement of the projected position of the image.

In Step ST21, the operation ECU 20 may determine whether the projected position varying process illustrated in FIG. 6 is to be terminated.

In a specific but non-limiting example, the operation ECU 20 may determine presence or absence of a hand operation of the occupant against the image object.

In one example, the operation ECU 20 may determine presence or absence of the hand operation of the occupant against the image object on the basis of the image acquired from the stereo camera 63 as the operation detecting device 44. The hand operation against the image object may include, for example but not limited to, an operation to press the image object by the fingertip and an operation to pet a surface of the image object.

In a case where it is determined that the hand operation of the occupant against the image object is detected (Y in Step ST21), the operation ECU 20 may terminate the projected position varying process illustrated in FIG. 6. Finally, the image projected from the 3D image projecting device 43 may be fixed at a position at which the occupant starts the hand operation, and continue to be projected. For example, in a case where a page image of an electronic book is projected as the image object after the projected position varying process illustrated in FIG. 6 is terminated, it is possible to prevent a projected position of the image from being moved carelessly even though the occupant performs an operation to roughly turn a page by the fingertip.

It is to be noted that, in one example, the operation ECU 20 may determine whether a line of sight of the occupant toward the image is fixed. In a case where it is determined that the line of sight is fixed, the operation ECU 20 may terminate the projected position varying process illustrated in FIG. 6.

Next, one example of a relationship between a projected position of an image varied by a movement operation of the occupant and settings of operation determination and a stimulation output will be described.

Figure 7:
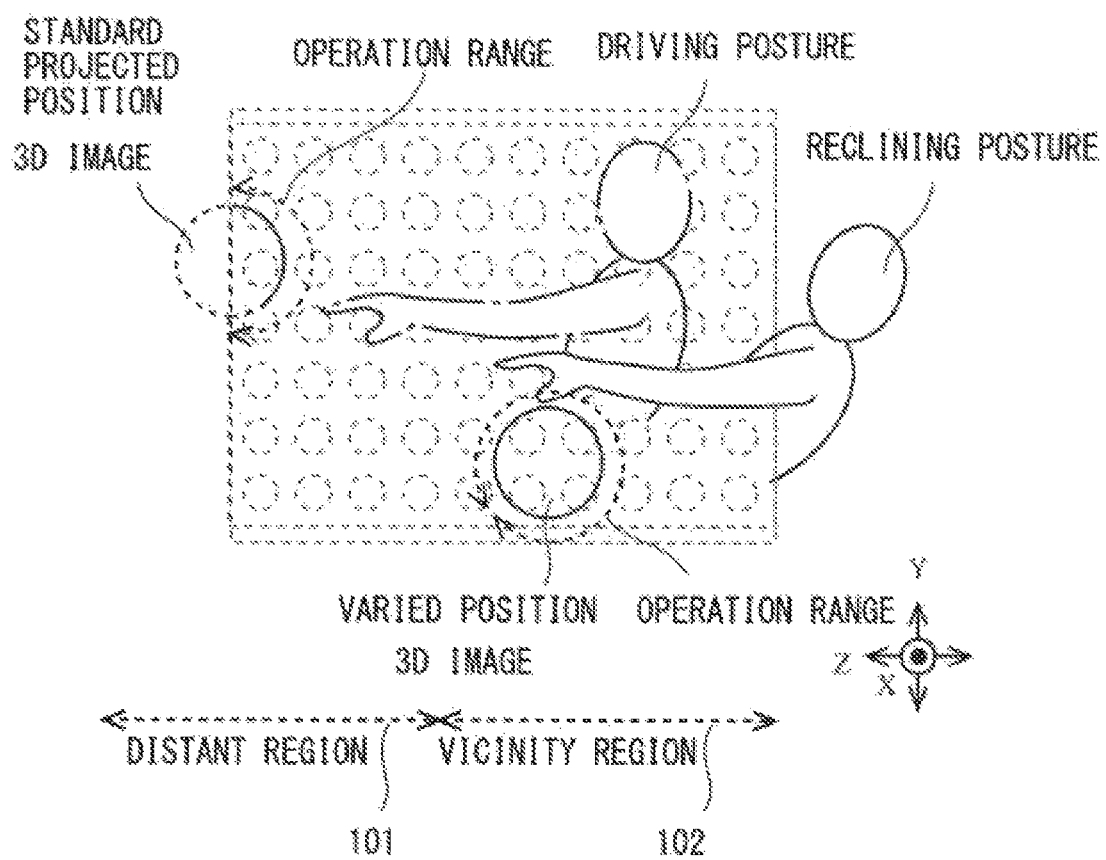
FIG. 7 is an explanatory diagram illustrating an example at a time when a projected position of an image is varied by the projected position varying process illustrated in FIG. 6.

FIG. 7 is an explanatory drawing of one example at a time when the projected position of the image is varied by the projected position varying process illustrated in FIG. 6.

FIG. 7 illustrates a state of the driving posture and the reclining posture as the riding state or the sitting state of the occupant.

In a case where the occupant takes the driving posture, the image may be so projected in the vicinity of the middle of a front boundary of the hollow square frame body 64 that the projected position of the image is set to the front side of the occupant. This position may become the standard projected position of the image for the occupant.

In contrast, in a case where the occupant is in the reclining state, the image may be so projected in the vicinity of the middle of lower side of the hollow square frame body 64 that the projected position is set to a region above the waist of the occupant.

The occupant may be allowed to operate the image object in any riding state or any sitting state by stretching his or her arm to the image to cause his or her hand to reach the image object.

In a case where the image is projected at the standard projected position, the image may be projected in a distant region 101 on the front side of the square frame body 64 with respect to the approximate middle in the front-back direction. In this case, in Step ST19, the operation ECU 20 as the device setting unit 55 may instruct the operation determining unit 52 to set a range that the occupant is allowed to operate the image object to the back half of the image of a three-dimensional model with respect to the front boundary of the square frame body 64.

In contrast, in a case where the image is projected at a projected position corresponding to the reclining state, the image may be projected in a vicinity region 102 on the back side of the square frame body 64 with respect to the approximate middle in the front-back direction. In this case, in Step ST19, the operation ECU 20 as the device setting unit 55 may instruct the operation determining unit 52 to set the range that the occupant is allowed to operate the image object to the approximately-whole surface of the image object of the three-dimensional model. By setting the approximately-whole surface of the image object of the three-dimensional model to the operable range in this manner, the occupant may be allowed to operate the image object of the three-dimensional model from the lower side even in a case where the image of the three-dimensional model is projected at a position above a place illustrated in FIG. 7 as an operation range for the varied position. Further, it is possible to widen a possibility of the content data directed to displaying of the image of the three-dimensional model.

Thus, the image containing the image object may be projected at the projected position based on the posture of the occupant, and an operation input against the 3D image object may become easier by varying the operable range of the occupant against the image object in accordance with the projected position based on the posture of the occupant.

FIG. 8 is an explanatory diagram of one example of an operation determining table 48 that indicates the switching content of an operation and a stimulation based on the projected position illustrated in FIG. 7.

It is to be noted that information, for example, on the projected positions illustrated in FIG. 7 and the operation determining table 48 illustrated in FIG. 8 may be recorded in the memory 47. The operation ECU 20 as the device setting unit 55 may read out the aforementioned information and the operation determining table 48 from the memory 47, and execute the processes in Steps ST19 and ST20.

The operation determining table 48 illustrated in FIG. 8 may have record for each operation type. In the example illustrated in FIG. 8, there may be, for example but not limited to, "push/pull", "specific motion", "pet/turn", "rotate", "hold/release", and "crush" as the operation types. In this example, operations of "push/pull" and "the specific motion" may be classified into a movement operation to move the projected position of the image. Operations from "pet/turn" to "crush" may be classified into a hand operation to vary a state of the image object.

In a case where the image is to be projected in the distant region 101, the operation ECU 20 as the device setting unit 55 may instruct the operation determining unit 52 to determine operation types whose "distant" columns illustrated in the operation determining table 48 indicate "○ (circle)". A group of such operation types is referred to as a second operation group. Further, the operation ECU 20 may instruct the stimulation response output unit 53 to output a weak stimulation as a stimulation setting corresponding to each of the operation types illustrated in the operation determining table 48.

In contrast, in a case where the image is to be projected in the vicinity region 102, the operation ECU 20 as the device setting unit 55 may instruct the operation determining unit 52 to determine operation types whose "adjacent" columns illustrated in the operation determining table 48 indicate "○ (circle)". A group of such operation types is referred to as a first operation group. Further, the operation ECU 20 may instruct the stimulation response output unit 53 to output a stronger stimulation than that in a case of the distant region 101 as stimulation setting corresponding to each of the operation types illustrated in the operation determining table 48.

In a case where the projected position of the image is varied between the distant region 101 and the vicinity region 102 in this manner, the device setting unit 55 may instruct the operation determining unit 52 to switch the operation group between the operation types corresponding to the distant region 101 (that is, the second operation group) and the operation types corresponding to the vicinity region 102 (that is, the first operation group).

In a case where the projected position of the image is varied between the position in the vicinity region 102 near the occupant and the position in the distant region 101 far from the occupant in this manner, the operation ECU 20 as the device setting unit 55 may vary the operation group to which the operation determined by the operation determining unit 52 belongs between the first operation group and the second operation group.

In the example embodiment, as illustrated in the operation determining table 48, the number of types of operations determined by the operation determining unit 52 when the projected position of the image is within the vicinity region 102 near the occupant, that is, the number of types of operations included in the first operation group may be more than the number of types of operations when the projected position of the image is within the distant region 101 far from the occupant, that is, the number of types of operations included in the second operation group.

Accordingly, for example, in a case where the image is displayed far away such as on the dashboard and the occupant is allowed to visually recognize only a portion, of the appearance of the image object, which faces the occupant, it may be sufficient that the operation determining unit 52 is allowed to determine only a few limited operations. Further, even though an operation of the occupant against the image object is shifted due to a shake of the vehicle compartment 3, the operation ECU 20 as the operation determining unit 52 may have a wide operation margin directed to determining of the few operation types, whereby it is possible to determine the operation of the occupant accurately and appropriately.

In contrast, for example, in a case where the image is displayed in the vicinity of the occupant such as on thighs or knees of the occupant and the occupant is allowed to finely perform various operations against the image object, it may be sufficient that the operation determining unit 52 is allowed to determine operations against the approximately-whole surface of the image object as operations as much as possible. The operation ECU 20 as the operation determining unit 52 may be allowed to determine more accurately and more appropriately the operation intended by the occupant on the basis of a slight difference of the operation.

For example, in a case where a head of an animal character is projected, the occupant may be allowed to operate only a face thereof when the head is projected on the dashboard, but may be allowed to operate all surfaces of the head when the head is projected on his or her knees.

Further, in a case where an image in which a large number of operation buttons are respectively assigned to a plurality of surfaces of a cube is projected, it is possible to suppress a mistakenly-performed operation against any operation button by moving the cube to the vicinity of the occupant.

Further, in a case where the projected position of the image is varied between the position in the vicinity region 102 near the occupant and the position in the distant region 101 far from the occupant, the operation ECU 20 as the device setting unit 55 may instruct the stimulation response output unit 53 to vary intensity of the stimulation outputted from the stimulation output device 45.

In a specific but non-limiting example, in a case where the projected position of the image is in the vicinity region 102, the operation ECU 20 as the device setting unit 55 may instruct the stimulation response output unit 53 to strengthen a tactile stimulation corresponding to each operation, compared with a case where the projected position of the image is in the distant region 101.

Thus, in a case where the image object is projected near the occupant, it becomes possible to touch a region of the image object, which the occupant cannot touch when the image object is projected far away from the occupant. This makes it possible to give an appropriate stimulation to an appropriate position of the occupant in accordance with such an operation of the occupant.

As described above, according to the non-contact operating apparatus 40 of the example embodiment, the image generating unit 51 generates and updates the image containing the image object that the occupant present within the vehicle compartment 3 of the vehicle 1 is allowed to operate. Further, the 3D image projecting device 43 projects the image in the predetermined display region within the vehicle compartment 3 of the vehicle 1. Further, the operation detecting device 44 detects the riding state or the sitting state of the occupant who is present in the vehicle 1. Further, the device setting unit 55 instructs the image generating unit 51 or the 3D image projecting device 43 to project the image at the position at which the image object is operable by the occupant who is in the riding state detected by the operation detecting device 44. This makes it possible to variably project the image containing the image object at the position at which the image object is operable by the occupant in accordance with the riding state of the occupant. For example, the operation ECU 20 as the device setting unit 55 may determine whether the occupant is sitting on the seat 4 provided in the vehicle compartment 3 with the driving posture on the basis of the riding state or the sitting state of the occupant detected by the operation detecting device 44. In a case where it is determined that the occupant is sitting on the seat 4 with the driving posture, the operation ECU 20 as the device setting unit 55 may instruct the image generating unit 51 or the 3D image projecting device 43 to project the image at the standard projected position at which the image is operable by the occupant with the driving posture. In a case where it is determined that the occupant is not sitting on the seat 4 with the driving posture, the operation ECU 20 as the device setting unit 55 may instruct the image generating unit 51 or the 3D image projecting device 43 to vary the projected position of the image from the standard projected position for the driving posture to the position different from the standard projected position, that is, the position at which the image object is operable by the occupant who is in the riding state detected by the operation detecting device 44.

Thereby, also in a case where the occupant who is present in the vehicle compartment 3 is sitting on the seat 4 with a posture with which the occupant is not allowed to drive the vehicle 1, the image containing the image object may be projected at the position at which the image object is operable by the occupant in the aforementioned state. Therefore, it is possible for the occupant to perform the operation against the projected image object even with a posture other than the driving posture.

The occupant is allowed to operate the image object projected within a range in which the occupant reaches the image object by the hand, and obtain the tactile stimulation based on the operation type as the response to the operation.

The specific example embodiments have been described above; however, the described example embodiments are merely examples, and do not limit the scope of the technology. Various kinds of deformations or variations can be made without departing from the subject matter of the technology.

For example, in the example embodiment described above, the non-contact operating apparatus 40 may be provided in a vehicle such as the vehicle 1.

In addition, for example, the non-contact operating apparatus 40 may be provided in the seat 4 used by the occupant or under the seat 4. Further, the non-contact operating apparatus 40 may be provided as a separate apparatus from the vehicle 1 or the seat 4, and can be installed at a predetermined position in the vehicle 1 or under the seat 4 by the occupant oneself.

As explained above, according to the non-contact operating apparatus 40 of one example embodiment of the technology, the image generating unit 51 generates and updates the image containing the image object that the occupant present within the vehicle compartment 3 of the vehicle 1 is allowed to operate. Further, the 3D image projecting device 43 projects the image in the predetermined display region within the vehicle compartment 3 of the vehicle 1. Further, the operation detecting device 44 detects the riding state of the occupant who is present in the vehicle 1. The device setting unit 55 instructs the image generating unit 51 or the 3D image projecting device 43 to project the image at the position at which the image object is operable by the occupant who is in the riding state detected by the operation detecting device 44. This makes it possible to variably project the image containing the image object at the position at which the image object is operable by the occupant in accordance with the riding state of the occupant. For example, the device setting unit 55 may determine, on the basis of the riding state of the occupant detected by the operation detecting device 44, whether the occupant is sitting on the seat provided in the vehicle compartment with the driving posture. In a case where it is determined that the occupant is sitting on the seat 4 with the driving posture, the device setting unit 55 may instruct the 3D image projecting device 43 or the image generating unit 51 to project the image at the standard projected position at which the image object is operable by the occupant with the driving posture. In contrast, in a case where it is determined that the occupant is not sitting on the seat 4 with the driving posture, the device setting unit 55 may instruct the image generating unit 51 or the 3D image projecting device 43 to vary the projected position of the image from the standard projected position to the position at which the image object is operable by the occupant detected by the operation detecting device 44.

In one embodiment, the image generating unit 51 may serve as a "generating unit." In one embodiment, the vehicle 1 may serve as a "vehicle." In one embodiment, the 3D image projecting device 43 may serve as a "projecting device." In one embodiment, the operating detecting device 44 may serve as a "detecting device." In one example embodiment, the device setting unit 55 and the stimulation output device 45 may serve as a "setting unit."

Accordingly, also in a case where the occupant who is present in the vehicle compartment 3 is sitting on the seat 4 with the posture with which the occupant is not allowed to drive the vehicle 1, the image containing the image object is projected at the position at which the image object is operable by the occupant in that state. Therefore, it is possible for the occupant to perform the operation against the projected image object also with a posture other than the driving posture.

Each of the drive ECU 11, the steering ECU 12, the brake ECU 13, the automatic driving/driving assist ECU 14, the driving operation ECU 15, the detection ECU 16, the air-conditioning ECU 17, the occupant monitoring ECU 18, the external communication ECU 19, the operation ECU 20, the system ECU 21, and the non-contact operating apparatus 40 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the ECUs 11 to 21 and the non-contact operating apparatus 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the ECUs 11 to 21 and the non-contact operating apparatus 40 illustrated in FIG. 2.

Although one example embodiment of the technology has been described in the foregoing by way of example with reference to the accompanying drawings, the technology is by no means limited to the example embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A non-contact operating apparatus for a vehicle, comprising:
    an image generator configured to generate and update an image containing an image object, the image object being operable by an occupant present within a vehicle compartment of the vehicle;
    a projector configured to project the image in a predetermined display region within the vehicle compartment of the vehicle;
    a detector configured to detect a riding state of the occupant who is present in the vehicle compartment of the vehicle;
    a setting device configured to instruct the projector or the image generator to project the image at a position at which the image object is operable by the occupant who is in the riding state detected by the detector; and
    a processor, wherein
    the detector is configured to detect an operation site of the occupant positioned in a vicinity of the predetermined display region within the vehicle compartment,
    the processor is configured to determine whether the operation site of the occupant detected by the detector performs a non-contact operation against the image object, and wherein
    in a case where the operation site of the occupant is determined as performing the non-contact operation against the image object, the processor is configured to further determine a type of the non-contact operation from a predetermined operation group, and
    the setting device is configured to instruct the projector or the generator to project the image at a specific position in a case where the non-contact operation determined by the processor is specific motion set in advance, the specific position being associated with the specific motion in advance, wherein
    in a case where the projected position of the image is varied between a position near the occupant and a position far from the occupant, the setting device is configured to instruct the processor to switch the predetermined operation group between a first operation group and a second operation group, the first operation group corresponding to the position near the occupant, the second operation group corresponding to the position far from the occupant.

2. The non-contact operating apparatus for a vehicle according to claim 1, wherein
    the setting device is configured to determine, on a basis of the riding state of the occupant detected by the detector, whether the occupant is sitting on a seat with a driving posture, the seat being provided in the vehicle compartment,
    in a case where the occupant is determined as being sitting on the seat with the driving posture, the setting device is configured to instruct the projector or the generator to project the image at a standard projected position, the standard position being a position at which the image object is being operable by the occupant with the driving posture, and
    in a case where the occupant is determined as not sitting on the seat with the driving posture, the setting device is configured to instruct the projector or the generator to vary a projected position of the image from the standard projected position to a position at which the image object is operable by the occupant in the riding state detected by the detector.

3. A vehicle, comprising:
    the non-contact operating apparatus according to claim 2; and
    two or more control devices coupled to the non-contact operating apparatus through an internal network, each of the two or more control devices being configured to control an operation of the vehicle, each of the two or more control devices being configured to acquire input information from the non-contact operating apparatus through the internal network, the input information being generated on a basis of a non-contact operation of the occupant against the image object in the image, the image being projected within the vehicle compartment by the non-contact operating apparatus.

4. The non-contact operating apparatus for a vehicle according to claim 1, wherein, in a case where the detector detects, as the specific motion, motion in which the occupant causes both palms to face upward and the processor determines, as the specific motion, the motion in which the occupant causes the both palms to face upward, the setting device is configured to instruct the projector or the generator to project the image at the specific position above the both palms.

5. The non-contact operating apparatus for a vehicle according to claim 4, wherein, in a case where the processor determines that the operation site of the occupant performs the non-contact operation against the image object, the setting device is configured to terminate variation in the projected position of the image.

6. A vehicle, comprising:
the non-contact operating apparatus according to claim 4; and
two or more control devices coupled to the non-contact operating apparatus through an internal network, each of the two or more control devices being configured to control an operation of the vehicle,
each of the two or more control devices being configured to acquire input information from the non-contact operating apparatus through the internal network, the input information being generated on a basis of a non-contact operation of the occupant against the image object in the image, the image being projected within the vehicle compartment by the non-contact operating apparatus.

7. The non-contact operating apparatus for a vehicle according to claim 1, wherein, in a case where the processor determines that the operation site of the occupant performs the non-contact operation against the image object, the setting device is configured to terminate variation in the projected position of the image.

8. The non-contact operating apparatus for a vehicle according to claim 1, wherein the number of the types of operations included in the first operation group is more than the number of the types of operations included in the second operation group.

9. A vehicle, comprising:
the non-contact operating apparatus according to claim 1; and
two or more control devices coupled to the non-contact operating apparatus through an internal network, each of the two or more control devices being configured to control an operation of the vehicle,
each of the two or more control devices being configured to acquire input information from the non-contact operating apparatus through the internal network, the input information being generated on a basis of a non-contact operation of the occupant against the image object in the image, the image being projected within the vehicle compartment by the non-contact operating apparatus.

10. A non-contact operating apparatus for a vehicle comprising:
image generator configured to generate and update an image containing an image object, the image object being operable by an occupant present within a vehicle compartment of the vehicle;
projector configured to project the image in a predetermined display region within the vehicle compartment of the vehicle;
detector configured to detect a riding state of the occupant who is present in the vehicle compartment of the vehicle;
a setting device configured to instruct the projector or the image generator to project the image at a position at which the image object is operable by the occupant who is in the riding state detected by the detector;
an output stimulator configured to output a tactile stimulation based on an ultrasound field to an operation site of an occupant; and
a response stimulator configured to cause the output stimulator to output, on a basis of a determination result of a processor, the tactile stimulation as a response to the operation, to the operation site of the occupant performing a non-contact operation against an image object, wherein,
in a case where a projected position of the image is at a position near the occupant, the setting device is configured to instruct the response stimulator to cause the tactile stimulation to be greater than the tactile stimulation in a case where the projected position of the image is at a position far from the occupant.

11. A non-contact operating apparatus for a vehicle, comprising:
a processor configured to control an operation of the non-contact operating apparatus;
at least one of a projector and a display configured to project an image in a predetermined display region within a vehicle compartment of a vehicle, the image containing an image object; and
at least one of a camera and a scanner configured to detect a riding state of an occupant who is present in the vehicle, wherein
the processor is configured to
generate and update the image, and
give an instruction related to a setting for at least one of the projector and the display and a setting regarding generation or update of the image to project the image at a position at which the image object is operable by the occupant who is in the riding state detected by at least one of the camera and the scanner,
at least one of the camera and the scanner is configured to detect an operation site of the occupant positioned in a vicinity of the predetermined display region within the vehicle compartment,
the processor is configured to:
determine whether the operation site of the occupant detected by the camera and/or the scanner performs a non-contact operation against the image object, and wherein
in a case where the operation site of the occupant is determined as performing the non-contact operation against the image object, the determining further comprises determine a type of the non-contact operation from a predetermined operation group, and
cause the projector and/or the display to project the image at a specific position in a case where the non-contact operation determined by the processor is specific motion set in advance, the specific position being associated with the specific motion in advance, wherein
in a case where the projected position of the image is varied between a position near the occupant and a position far from the occupant, the predetermined operation group between a first operation group and a second operation group is switched, the first operation group corresponding to the position near the occupant, the second operation group corresponding to the position far from the occupant.

* * * * *